United States Patent
Schmitz

[19]

[11] Patent Number: 5,887,555
[45] Date of Patent: Mar. 30, 1999

[54] COOLING DEVICE FOR A FUEL PUMP AND FUEL IN A MARINE COMBUSTION ENGINE

[75] Inventor: Jeffrey Thomas Schmitz, St. Clair Shores, Mich.

[73] Assignee: Thermo Power Corporation, Waltham, Mass.

[21] Appl. No.: 103,715

[22] Filed: Jun. 23, 1998

[51] Int. Cl.[6] ............................................. F02M 17/00
[52] U.S. Cl. .................................. 123/41.31; 123/541
[58] Field of Search ........................... 123/509, 41.31, 123/514, 510, 541

[56] References Cited

U.S. PATENT DOCUMENTS

| | | | |
|---|---|---|---|
| 2,120,779 | 6/1938 | Ericson | 123/170 |
| 2,994,311 | 8/1961 | Shuck | 123/119 |
| 3,835,822 | 9/1974 | Mickle et al. | 123/41.31 |
| 3,973,536 | 8/1976 | Zelders | 123/541 |
| 4,084,564 | 4/1978 | Rickert | 123/541 |
| 4,411,239 | 10/1983 | Kelch | 123/557 |
| 4,689,025 | 8/1987 | Ferguson | 123/41.31 |
| 4,728,306 | 3/1988 | Schneider | 440/1 |
| 4,768,492 | 9/1988 | Widmer et al. | 123/541 |
| 4,848,283 | 7/1989 | Garms et al. | 123/73 AD |
| 4,898,141 | 2/1990 | Fiedler | 123/541 |
| 4,980,588 | 12/1990 | Ogawa | 123/41.31 |
| 5,015,159 | 5/1991 | Mine | 123/41.31 |
| 5,170,753 | 12/1992 | Sato | 123/41.09 |
| 5,251,603 | 10/1993 | Watanabe et al. | 123/541 |
| 5,438,962 | 8/1995 | Iwata et al. | 123/41.31 |
| 5,647,331 | 7/1997 | Swanson | 123/516 |
| 5,694,895 | 12/1997 | Tsunoda | 123/41.31 |

FOREIGN PATENT DOCUMENTS 3440060  5/1986  Germany ................................ 123/541

*Primary Examiner*—Carl S. Miller
*Attorney, Agent, or Firm*—Pandiscio & Pandiscio; Scott R. Foster

[57] ABSTRACT

A cooling device for a fuel pump and for fuel in a marine internal combustion engine fuel system includes a housing for water circulation therethrough, a fuel pump disposed in the housing and cooled by the water therein, the fuel pump having a fuel inlet and a fuel outlet, a fuel conduit connected to the fuel pump inlet for delivering fuel to the fuel pump, and a fuel recycle line extending through the housing for conducting unused fuel from an internal combustion engine to the fuel conduit. The water circulating in the housing is operative to cool the fuel pump and fuel therein, and to cool the unused fuel in the fuel recycle line.

10 Claims, 1 Drawing Sheet

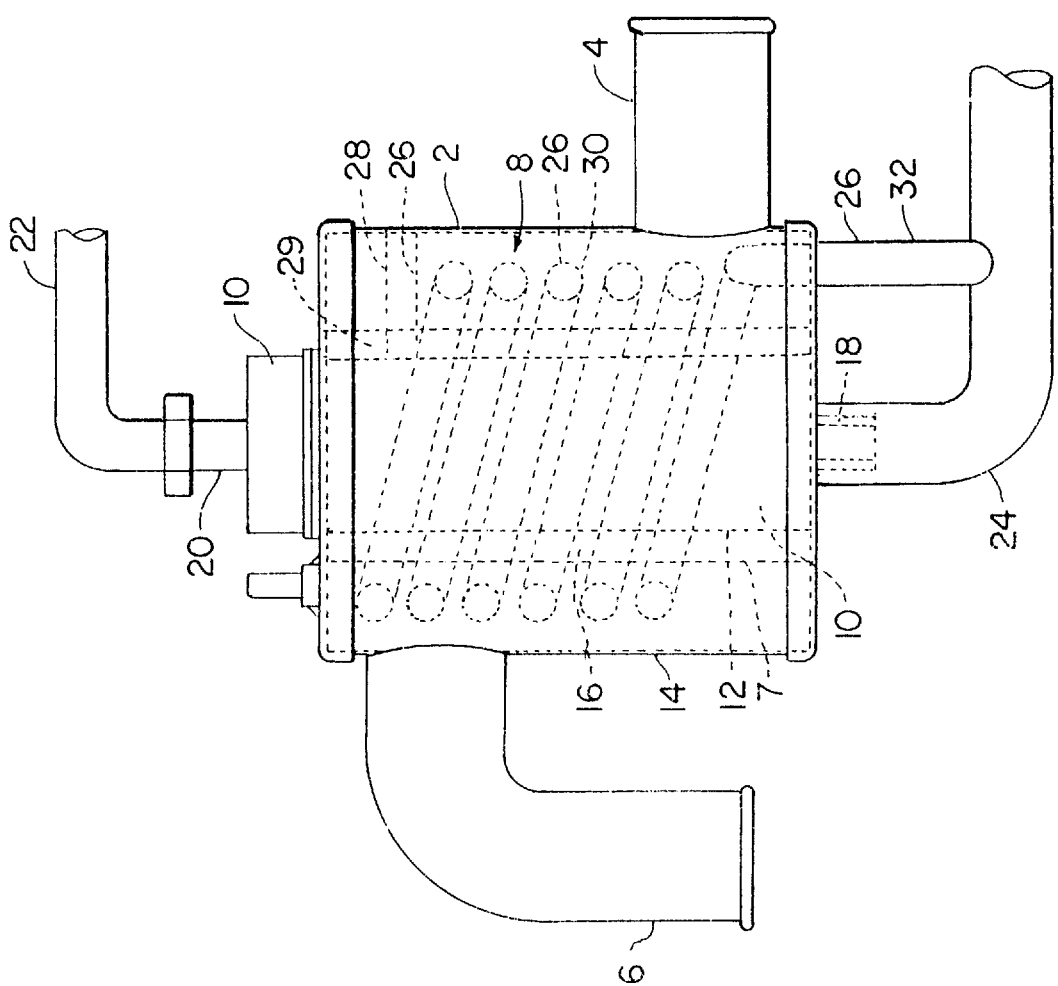

COOLING DEVICE FOR A FUEL PUMP AND FUEL IN A MARINE COMBUSTION ENGINE

BACKGROUND OF THE INVENTION

1. Field of the Invention

This invention relates to fuel systems for internal combustion engines and is directed more particularly to a device for cooling a fuel pump and fuel in a fuel system of a marine internal combustion engine.

2. Description of the Prior Art

It is known that an internal combustion fuel system subject to high temperatures will experience "vapor lock" when the fuel reaches the temperature at which the fuel vaporizes. It is further known that fuel pumps, typically with tight tolerance between rotor and housing, expand under high temperature operations, expanding the space between rotor and housing, leading to inefficiency in operation. Still higher temperatures are known to cause the flashing of vapor in the pump which is designed to operate only with the liquid fuel.

In the automotive industry, the fuel pump frequently is placed in the fuel tank, stabilizing the temperature of the pump and fuel therein. However, in marine applications it is required by the Coast Guard that fuel pumps be no more than twelve inches from the engine, eliminating the fuel tank from consideration as a cool place in which to locate the fuel pump. The fuel pump thus absorbs heat from engine surfaces and from the ambient environment, leading to unduly high temperatures, causing the aforementioned vaporization of fuel in the pump and/or system and a marked reduction in fuel pump efficiency. The likelihood of fuel vaporization is increased in marine applications by the known fact that fuel vaporizes at a substantially lower temperature when placed under a negative pressure, as when pulled from a fuel tank by a fuel pump external to the tank, than when placed under a positive pressure provided by a fuel pump inside the fuel tank.

Aggravating the above scenario is the fact that a marine fuel system must be able to idle indefinitely and in the idling state, the fuel temperature rise is greatest. This is because more of the fuel is unused fuel recycled through a fuel recycle line to the system from the engine, with relatively little cool "new" fuel being added. Further, even after shut down of the system, for the first hour, or so, the temperatures in the bilge climb, subjecting fuel lines and the fuel pump to increased heat, often causing vapor lock conditions and a "non start" situation when restart of the engine is sought.

There is thus a need for a device which stabilizes the temperature of the fuel pump and fuel therein, and cools the fuel in the fuel recycle line, thereby cooling the fuel in the system generally so as to maintain the fuel and the fuel pump in a relatively cool condition, below vaporization temperature of the fuel, and permitting the pump to operate continuously at high efficiency.

SUMMARY OF THE INVENTION

It is, therefore, an object of the invention to provide a cooling device for cooling a marine internal combustion fuel pump, and the fuel therein, to prevent vaporization of fuel in the fuel pump, and to provide for efficient operation of the fuel pump.

A further object of the invention is to provide such a cooling device for cooling unused fuel in the fuel recycle line before the unused fuel is fed into the fuel pump, thereby contributing to cool operation of the fuel pump and to cooling of the fuel in the fuel system.

A still further object of the invention is to provide such a cooling device capable of utilizing an outside water source, such as sea water, for effecting cooling of the fuel pump and fuel.

With the above and other objects in view, as will hereinafter appear, a feature of the present invention is the provision of a cooling device for a fuel pump and for fuel in a marine internal combustion engine fuel system. The device comprises a housing for water circulation therethrough, a fuel pump disposed in the housing and cooled by the water therein, the fuel pump having a fuel inlet and a fuel outlet, a fuel conduit connected to the fuel pump inlet for delivering fuel to the fuel pump, and a fuel recycle line extending through the housing for conducting unused fuel from an internal combustion engine to the fuel conduit. The water circulating in the housing is operative to cool the fuel pump and fuel therein, and to cool the unused fuel in the fuel recycle line.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention, from which its novel features and advantages will be apparent.

The drawing is a side elevational view of one form of cooling device illustrative of an embodiment of the invention.

DESCRIPTION OF THE PREFERRED EMBODIMENT

Referring to the drawing, it will be seen that the illustrative cooling device includes a housing 2 provided with a water inlet 4 and a water outlet 6. The housing 2 includes an interior wall 7 and an exterior wall 14 which define an annular chamber 8 wherein water from the water inlet 4 circulates and exits through the water outlet 6.

A fuel pump 10 is mounted in the housing 2 with side walls 12 of the fuel pump 10 spaced from interior walls 7 of the housing 2 to define therebetween an annular space 16. The fuel pump 10 is provided with a fuel pump inlet 18 and a fuel pump outlet 20. A fuel outlet tube 22 is connected to the fuel pump outlet 20 for conveying fuel from the fuel pump 10 to a filter and internal combustion engine (neither shown).

A fuel conduit 24 is connected to the fuel pump inlet 18 for conveying fuel from a fuel tank (not shown) to the fuel pump 10.

A fuel recycle line 26 includes an inlet portion 28 through which unused fuel from the engine enters the housing 2, a coil portion 30 which preferably winds around the wall 7 in the housing 2 and which receives the unused fuel from the fuel recycle line inlet portion 28, and an outlet portion 32 extending from the fuel recycle line coil portion 30 to the fuel conduit 24. Thus, the fuel recycle line 26 flows fuel unused by the engine through the cooling chamber 8 and into the fuel conduit 24 which, in turn, conveys the unused fuel, along with "new" fuel from the fuel tank, to the fuel pump 10.

The space 16 between the fuel pump 10 and the wall 7 preferably is packed with a heat conductive paste-like material 29, such as a silicon containing fine metal particles, which transfers heat from the fuel pump 10 to the circulating water in the chamber 8. Thus, the water cools the pump, but is not in direct contact with the pump. The separation of the fuel pump from the cooling water avoids corrosion of the fuel pump. The wall 7 and coil 30 preferably are of copper.

In operation, water flows through the chamber 8 on a continuous basis, cooling the fuel pump 10 and any fuel therein, and also cooling the unused fuel from the engine before the unused fuel is fed back into the fuel conduit 24 leading to the fuel pump 10. Accordingly, the fuel is maintained in a relatively cool condition and unlikely to undergo vaporization.

The water flowed through the chamber 8 preferably is taken from water in which the marine vehicle powered by the internal combustion engine system resides, such as sea water, lake water, and the like.

Upon initiating a start or restart of the system, the water in the chamber 8 immediately begins to cool the fuel pump 10, improving pump efficiency. The presence of cooling water around the fuel pump buffers the fuel pump from heat external to the housing 2. Further, the coil 30 contains a volume of cool fuel which is introduced to the fuel pump 10 when the system is started, preventing pump cavitation.

There is thus provided a cooling device which operates to maintain the fuel pump in a steady, relatively low temperature environment, and further operates to maintain the fuel in the system at a relatively cool temperature, substantially reducing the likelihood of vapor lock and facilitating efficient operation of the fuel pump.

It is to be understood that the present invention is by no means limited to the particular construction herein disclosed and/or shown in the drawings, but also comprises any modifications or equivalents within the scope of the claims.

What is claimed is:

1. A cooling device for a fuel pump and for fuel in a marine internal combustion engine fuel system, said device comprising:

a housing provided with a water inlet and a water outlet, said housing having spaced apart external and internal walls defining a chamber through which water circulates between said inlet and said outlet;

a fuel pump disposed in said housing within said internal wall, said fuel pump being provided with a fuel inlet and a fuel outlet;

a fuel conduit connected to said fuel pump fuel inlet for delivering fuel to said fuel pump; and a fuel recycle line having an inlet portion for conducting unused fuel from the internal combustion engine, a coil portion winding around said internal wall and through said chamber in said space between said external and internal walls of said housing, said coil portion receiving fuel from said fuel recycle line inlet portion, and an outlet portion extending between said fuel recycle line coil portion and said fuel conduit, to flow unused fuel from the engine through said housing and into said fuel conduit;

whereby said fuel pump and fuel therein are cooled by water in said chamber, and fuel in said fuel recycle line coil portion is cooled by water in said chamber, to maintain the fuel in a relatively cool condition to avoid vapor lock in the fuel system.

2. The cooling device in accordance with claim 1 wherein said water inlet provides water to said chamber from a water source in which is disposed a marine vessel housing the internal combustion engine fuel system.

3. A cooling device for a fuel pump and for fuel in a marine internal combustion engine fuel system, said device comprising:

a housing for water circulation therethrough;

a fuel pump disposed in said housing and cooled by the water therein, said fuel pump having a fuel inlet and a fuel outlet;

a fuel conduit connected to said fuel pump inlet for delivering fuel to said fuel pump; and a fuel recycle line extending through said housing for conducting unused fuel from the internal combustion engine to said fuel conduit;

whereby the water circulating in said housing is operative to cool said fuel pump and fuel therein, and to cool the unused fuel in said fuel recycle line.

4. The cooling device in accordance with claim 3 wherein said housing is provided with a water inlet and a water outlet.

5. The cooling device in accordance with claim 4 wherein said water inlet is in communication with a water source in which is disposed a marine vessel housing the internal combustion engine fuel system.

6. The cooling device in accordance with claim 5 wherein said water outlet directs water from said housing to provide cooling water for the internal combustion engine.

7. The cooling device in accordance with claim 4 wherein said fuel recycle line extends through said housing in a winding manner.

8. The cooling device in accordance with claim 7 wherein said fuel recycle line comprises a coil portion extending around said fuel pump.

9. The cooling device in accordance with claim 8 wherein said housing is provided with interior side walls spaced from exterior side walls of said housing to provide an annular space therebetween, said fuel recycle line coil portion is disposed in said annular space, and said fuel pump is disposed within and is spaced from said housing interior side walls.

10. The cooling device in accordance with claim 9 wherein said fuel recycle line further comprises an inlet portion for conducting unused fuel from the internal combustion engine to said coil portion, and an outlet portion extending from said coil portion to said fuel conduit.

\* \* \* \* \*